(12) United States Patent
Kilibarda

(10) Patent No.: US 7,677,428 B2
(45) Date of Patent: Mar. 16, 2010

(54) MOTOR VEHICLE BODY FRAMING APPARATUS

(75) Inventor: Velibor Kilibarda, Birmingham, MI (US)

(73) Assignee: Comau, Inc., Southfield, MI (US)

( * ) Notice: Subject to any disclaimer, the term of this patent is extended or adjusted under 35 U.S.C. 154(b) by 174 days.

(21) Appl. No.: 11/782,818

(22) Filed: Jul. 25, 2007

(65) Prior Publication Data
US 2008/0116247 A1    May 22, 2008

(51) Int. Cl.
B23K 37/04    (2006.01)
B23Q 3/00    (2006.01)

(52) U.S. Cl. .................. 228/4.1; 228/44.3; 228/49.1; 269/289 MR

(58) Field of Classification Search ............ 228/4.1, 228/47.1, 44.3, 49.1, 212, 213; 219/86.24, 219/86.25, 86.7, 80, 148, 161; 29/430, 331 S, 29/824, 281.1, 281.4, 469; 901/41, 42; 269/289 R, 269/303, 289 MR; 198/345.1
See application file for complete search history.

(56) References Cited

U.S. PATENT DOCUMENTS

| | | | | |
|---|---|---|---|---|
| 2,483,932 | A | * 10/1949 | Powell | 434/131 |
| 2,918,962 | A | * 12/1959 | Jones | 29/726 |
| 4,162,387 | A | 7/1979 | De Candia | 219/79 |
| 4,277,011 | A | * 7/1981 | Jeter | 242/615.2 |
| 4,442,335 | A | 4/1984 | Rossi | 219/79 |
| 4,535,927 | A | 8/1985 | Matsubara et al. | 228/6.1 |
| 4,606,488 | A | 8/1986 | Yanagisawa | 228/45 |
| 4,629,109 | A | 12/1986 | Matsushita | 228/49.1 |
| 4,972,987 | A | 11/1990 | Di Rosa | 228/4.1 |
| 5,037,022 | A | * 8/1991 | Rossi | 228/49.6 |
| 5,174,488 | A | 12/1992 | Alborante | 228/4.1 |
| 5,265,317 | A | 11/1993 | Angel | 29/429 |
| 5,267,683 | A | 12/1993 | Hamada et al. | 228/4.1 |
| 5,374,799 | A | 12/1994 | Nishimoto et al. | 219/117.1 |
| 5,397,047 | A | * 3/1995 | Zampini | 228/6.1 |
| 5,400,943 | A | 3/1995 | Rossi | 228/6.1 |
| 5,400,944 | A | 3/1995 | Zimmer et al. | 228/49.6 |
| 5,427,300 | A | 6/1995 | Quagline | 228/4.1 |

(Continued)

FOREIGN PATENT DOCUMENTS

JP    11-179557    7/1999

*Primary Examiner*—Jessica L. Ward
*Assistant Examiner*—Carlos Gamino
(74) *Attorney, Agent, or Firm*—Young Basile

(57) ABSTRACT

A motor vehicle body framing apparatus located at a welding station of a motor vehicle assembly line for use in precisely positioning body panels arriving at the welding station for welding. The apparatus includes a base structure positioned at the welding station and having a longitudinal extent in the direction of body panel movement and a transverse extent; a parking structure upstanding vertically from the base structure on either side of the welding station and each defining parking devices; and a pair of longitudinal side gates each carrying tooling fixtures for engagement with body side panels and each including parking devices operative in coaction with the parking devices on the upstanding parking structures to precisely position the gates on the parking structure and thereby precisely position the tooling fixtures relative to the body panels. A plurality of sets of gates each having tooling fixtures mounted thereon corresponding respectively to a plurality of motor vehicle body styles are provided and the sets of gates are selectively interchanged utilizing the coacting parking devices so as to readily exchange tooling fixtures to accommodate the plurality of body styles being produced on the assembly line.

6 Claims, 7 Drawing Sheets

U.S. PATENT DOCUMENTS

| | | |
|---|---|---|
| 5,548,096 A | 8/1996 | Akasaka et al. .......... 219/117.1 |
| 5,560,535 A * | 10/1996 | Miller et al. ............... 228/49.1 |
| 5,687,962 A * | 11/1997 | Goodrich .................... 269/317 |
| 5,902,496 A * | 5/1999 | Alborante ................. 219/86.24 |
| 5,943,768 A * | 8/1999 | Ray ............................ 29/822 |
| RE36,541 E | 2/2000 | Rossi |
| 6,173,881 B1 | 1/2001 | Sloan et al. .................. 228/4.1 |
| 6,293,454 B1 * | 9/2001 | Zhang et al. ................. 228/4.1 |
| 6,344,629 B1 | 2/2002 | Kato et al. .................. 219/148 |
| 6,389,698 B1 * | 5/2002 | Malatier ..................... 29/897.2 |
| 6,467,675 B1 | 10/2002 | Ozaku et al. ................. 228/175 |
| 6,595,407 B2 * | 7/2003 | McNamara et al. ......... 228/212 |
| 6,691,392 B2 | 2/2004 | Savoy et al. ............. 29/407.09 |
| 6,835,909 B2 | 12/2004 | Nakamura et al. ......... 219/86.7 |
| 6,908,024 B2 | 6/2005 | Martin et al. ............... 228/115 |
| 6,932,263 B2 | 8/2005 | Kilabarda et al. .......... 228/49.1 |
| 6,966,421 B2 | 11/2005 | Nakamura ................ 198/345.1 |
| 7,128,196 B2 * | 10/2006 | Oldford et al. ........... 198/345.3 |
| 7,232,027 B2 * | 6/2007 | Kilibarda ................. 198/465.4 |
| 7,271,367 B2 * | 9/2007 | Kilibarda et al. ............ 219/158 |
| 2005/0035175 A1 | 2/2005 | Nakamura et al. ......... 228/44.3 |
| 2006/0289414 A1 | 12/2006 | Kilabarda et al. ............ 219/158 |

* cited by examiner

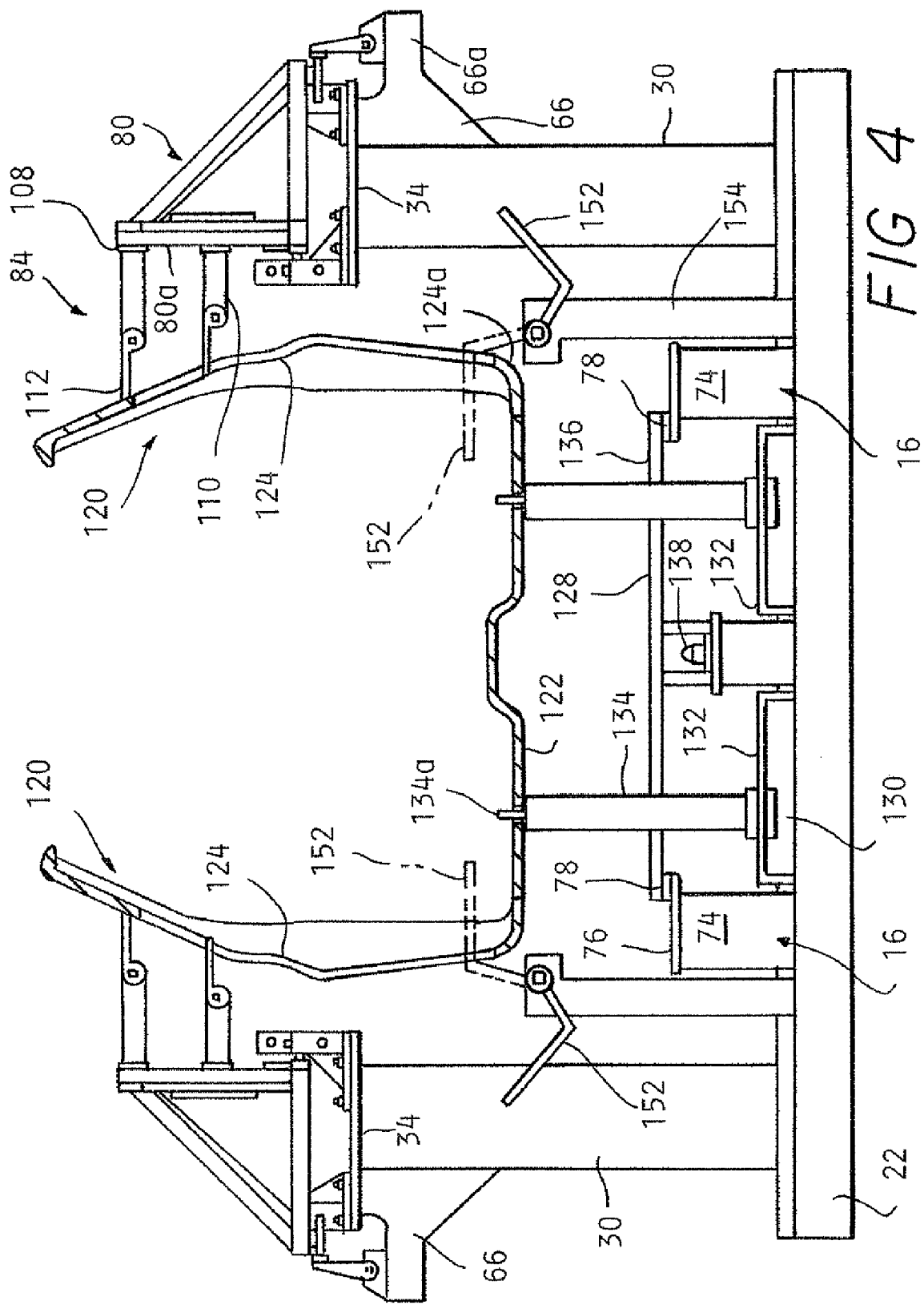

MOTOR VEHICLE BODY FRAMING APPARATUS

FIELD OF THE INVENTION

This invention relates to a production line framing apparatus for clamping and thereafter welding a loosely assembled vehicle body and more particularly to a framing apparatus that accurately positions and locates predetermined areas of a loosely assembled vehicle body at a welding station on a motor vehicle assembly line for accurately clamping and welding the vehicle body together with a high degree of repeatability between consecutive vehicle bodies on the production line.

BACKGROUND OF THE INVENTION

The construction of a unitized vehicle body commences with the formation of individual major body panels by stamping the panels from sheet metal blanks. Typically these major panels include a floor panel, right and left body side panels, a fire wall and either a roof panel or transversely extending header members to which a roof panel is subsequently mounted. After the individual panels are stamped, some preliminary assembly operations may then be performed on the individual panels such as, for example, adding door hinge and latch hardware at the body side panels at appropriate locations proximate the door opening, adding seat mounting brackets, adding reinforcements to the body panel, etc.

Next a set of panels that together constitute a sub-assembly of the finished vehicle body is loosely assembled together. This initial loose assembly of panels frequently is accomplished by a "toy tab" arrangement in which one or more panels is formed with a tab which projects from an edge and which is received in a slot in an adjacent panel. This technique interlocks the panels and frame members to each other to thereby form a preliminary loosely assembled vehicle body wherein the panels and frame members will not separate from each other but wherein the panels and frame members are free to tilt or otherwise move relative to one another. This initial loosely-assembled subassembly is then brought, as for example by a pallet riding on rails, to a welding station on the motor vehicle assembly line where the various panels and frames are welded to each other in a rigid permanently assembled relationship. This initial welding operation step at the welding station is one of the most important steps in the assembly of the vehicle body because it establishes the final welding alignment of all of the various panels and headers relative to each other which is essential to subsequent assembly operations performed on the sub-assembly. During the welding operation it is imperative that the various panels and headers be precisely and accurately located and aligned relative to one another and be held fixedly in the desired position. The positioning of the various panels and header members during the welding operation at the welding station is accomplished utilizing a framing apparatus located at the welding station and including a plurality of gates. For example, a pair of side gates may be utilized wherein tooling fixtures carried by the gates suitably engage the assembled body panels to fix them into desired finalized positions whereafter programmable welding robots, each provided with a welding gun, perform welding operations on the assembled body components as they are held in place by the gates and the tooling fixtures.

Modern day motor vehicle assembly plants are typically set up to produce a plurality of different car models and/or a plurality of different body styles for a particular car model.

Since each car model and/or body style requires unique tooling fixtures to provide the finalized positioning of the body panels at the welding station, it is important to provide a quick and efficient changeover of tooling fixtures at the welding station to accommodate a rapid changeover from one motor vehicle body style to another.

SUMMARY OF THE INVENTION

This invention is directed to an improved motor vehicle body framing apparatus.

More particularly, this invention is directed to a motor vehicle framing apparatus providing rapid and efficient changeover of tooling fixtures to accommodate different models and/or different body styles.

This invention relates to a motor vehicle body framing apparatus located at a welding station for use in precisely positioning a plurality of body panel sets, corresponding respectively to a plurality of motor vehicle body styles, at the welding station for welding.

According to the invention, the framing apparatus includes a plurality of sets of gates each having tooling fixtures mounted thereon corresponding respectively to the plurality of motor vehicle body styles and each having identical parking devices, and a plurality of parking structures positioned at the welding station and each having a parking device operative in coaction with the gate parking device to precisely position the respective gate at the welding station. With this arrangement, the sets of gates may be rapidly and precisely interchanged to facilitate a rapid and precise changeover from one body style to another.

According to a further feature of the invention, each parking structure includes a plurality of longitudinally spaced pillars and a parking device positioned on top of each pillar for coaction with the parking devices on the respective gates. This specific construction further facilitates the rapid and precise interchange of the sets of gates.

According to a further feature of the invention, the parking devices coact to position the gates in X (longitudinal), Y (transverse) and Z (vertical) coordinates, whereby to insure the precise positioning of the gates at the welding station.

According to a further feature of the invention, each pillar parking device includes a set of rollers arranged in a circumferential array to define an opening therebetween, and each gate parking device includes a pilot pin sized to fit in an opening of a respective pillar parking device.

According to a further feature of the invention, each set of rollers includes a pair of longitudinally spaced rollers arranged for rotation about vertical axis and a pair of vertically spaced rollers arranged for rotation about longitudinal axis, and each pilot pin extends transversely into a respective opening.

According to a further feature of the invention, each set of rollers comprises a first inboard set of rollers; each pillar parking device further includes an outboard set of rollers arranged to define an outboard opening therebetween; and each gate parking device further includes a transversely extending guide plate-sized to slide transversely into the outboard opening between an outboard set of rollers.

According to a further feature of the invention, each pillar parking device further includes an arm positioned outboard a respective outboard roller set and arranged for pivotal movement between a rest position allowing entry of a respective guide plate into a respective outboard opening and a locked position abuttingly engaging an outboard edge of the guide plate to preclude inadvertent displacement of the respective gate out of its precisely parked position.

The invention also provides a method of accurately positioning a plurality of body panel sets, corresponding respectively to a plurality of motor vehicle body styles, at a welding station on a motor vehicle assembly line. The invention method comprises providing a plurality of sets of gates each having tooling fixtures mounted thereon corresponding respectively to the plurality of motor vehicle body styles and each having identical parking devices; providing a plurality of parking structures at the welding station each having a parking device operative in coaction with a gate parking device to precisely position the respective gate at the welding station; positioning a first set of gates having tooling fixtures corresponding to a first motor vehicle body style on the parking structures to facilitate the positioning and welding of body panels of the first motor vehicle body style; and removing the first set of gates from the parking structures and positioning a second set of gates having tooling fixtures corresponding to a second motor vehicle body style on the parking structures to facilitate the positioning and welding of the body panels of the second motor vehicle body style. This methodology allows the sets of gates to be rapidly and precisely interchanged to facilitate a rapid and precise changeover from one body style to another.

BRIEF DESCRIPTION OF THE DRAWINGS

The description herein makes reference to the accompanying drawings wherein a specific embodiment of the generic invention is disclosed in detail, wherein like reference numerals refer to like parts throughout the several views, and wherein:

FIG. 4 is an end view of the framing station;

DETAILED DESCRIPTION OF THE PREFERRED EMBODIMENT

The preferred embodiment described hereinafter illustrates one specific hardware configuration for carrying out the generic, conceptual invention hereinabove described in the Summary of the Invention.

Figure 1:
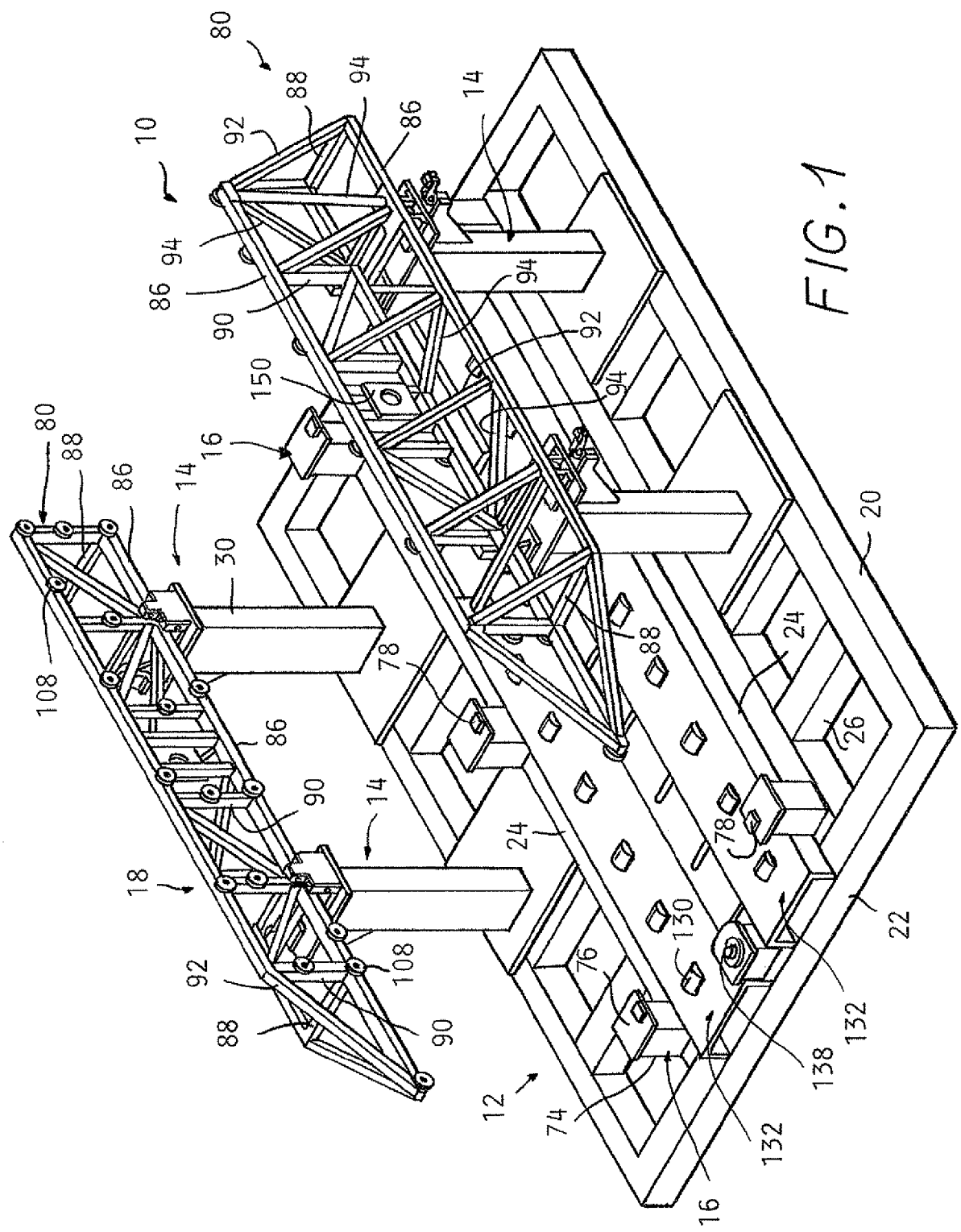
FIG. 1 is a perspective view of a framing station according to the invention.

The framing station 10 seen in FIG. 1, broadly considered, includes a base structure 12, parking structures 14, locating structures 16, and a plurality of sets of gate structures 18 (see also FIGS. 1A, 1B, and 1C) adapted to be parked on top of the parking structures 14 utilizing robots in known manner.

The base structure 12 has an open rectangular configuration and includes longitudinal side beams 20, end beams 22, intermediate longitudinal beams 24, and cross-beams 26 extending between each side beam 20 and intermediate beam 24.

Figure 8:
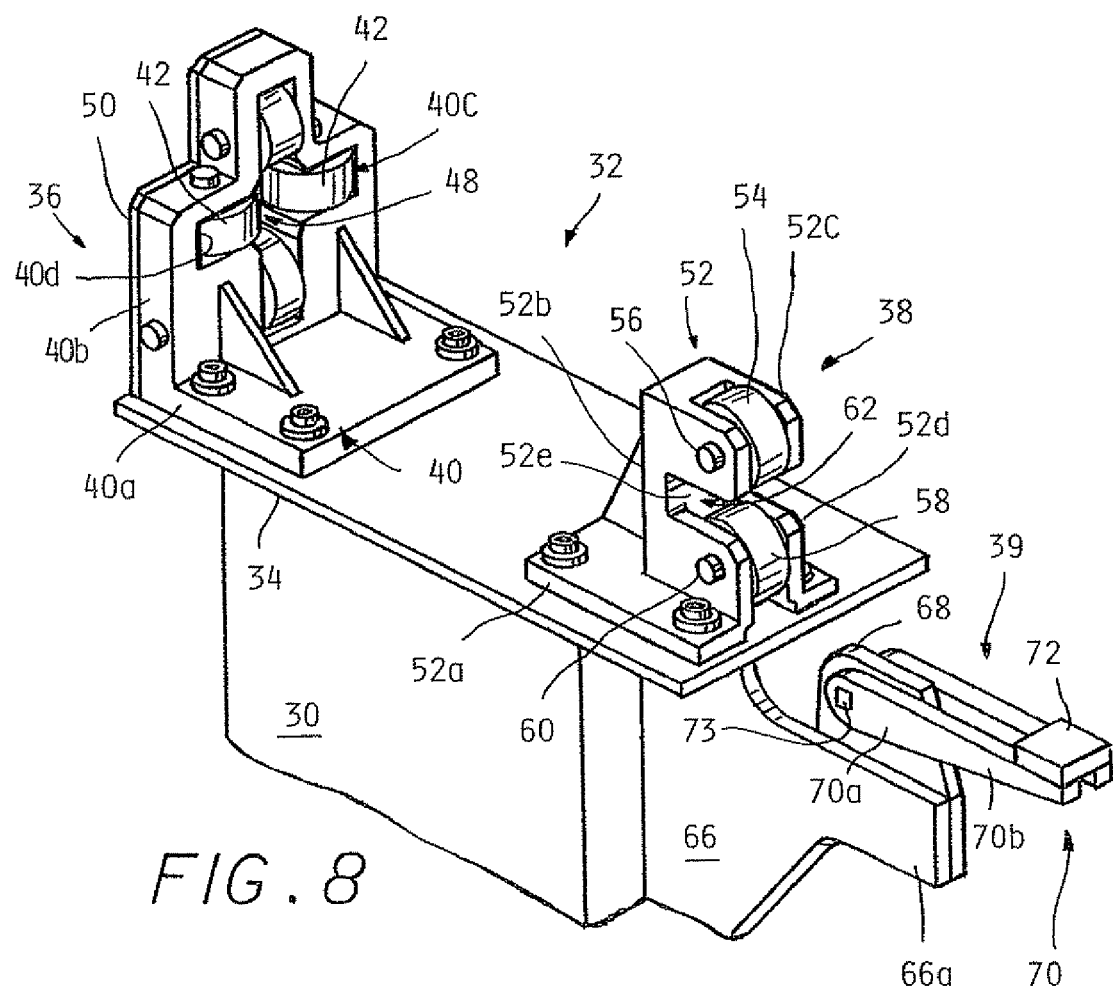

Each parking structure 14 (FIGS. 1 and 8) includes a pillar 30 rigidly upstanding from the base structure and a parking device 32 positioned on top of the pillar. As shown, two leftside parking structures 14 are provided on the left side of the base structure and two rightside parking structures 14 are provided on the right side of the base structure for a total of four parking structures.

Each parking device 32 includes a base plate 34 positioned on top of the respective pillar, an inboard roller assembly 36, an outboard roller assembly 38, and a clamp assembly 39.

Figure 9:
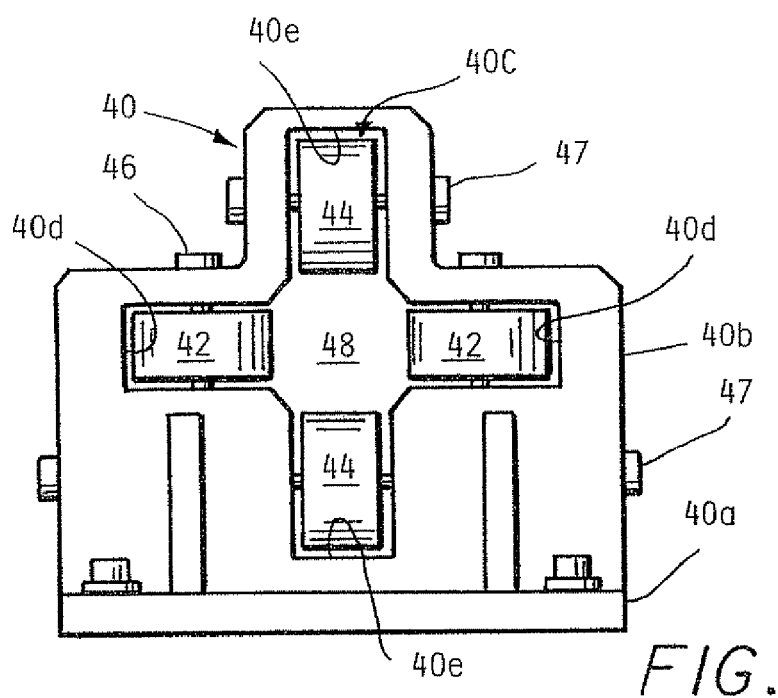

Each inboard roller assembly 36 (see also FIG. 9) includes an "L" shaped mounting member 40 including a horizontal portion 40a suitably secured to the base plate 34 and a vertical portion 40b defining a cross shaped through passage 40c.

A pair of rollers 42 are positioned in longitudinally spaced relation in longitudinally spaced portions 40d of passage 40c and a pair of upper and lower rollers 44 are positioned in vertically spaced relation in upper and lower portions 40e of passage 40c. Rollers 42 are journaled for rotation on vertical pivot pins 46 and rollers 44 are journaled for rotation on longitudinal pivot pins 47 and the confronting peripheral faces of rollers 42, 42, 44, 44 coact to define a generally rectangular inboard opening 48.

Each inboard roller assembly 36 further includes a backing plate 50 secured to the inboard face of vertical portion 40b and providing a delimiting inboard boundary for passage 40c.

Figure 7:
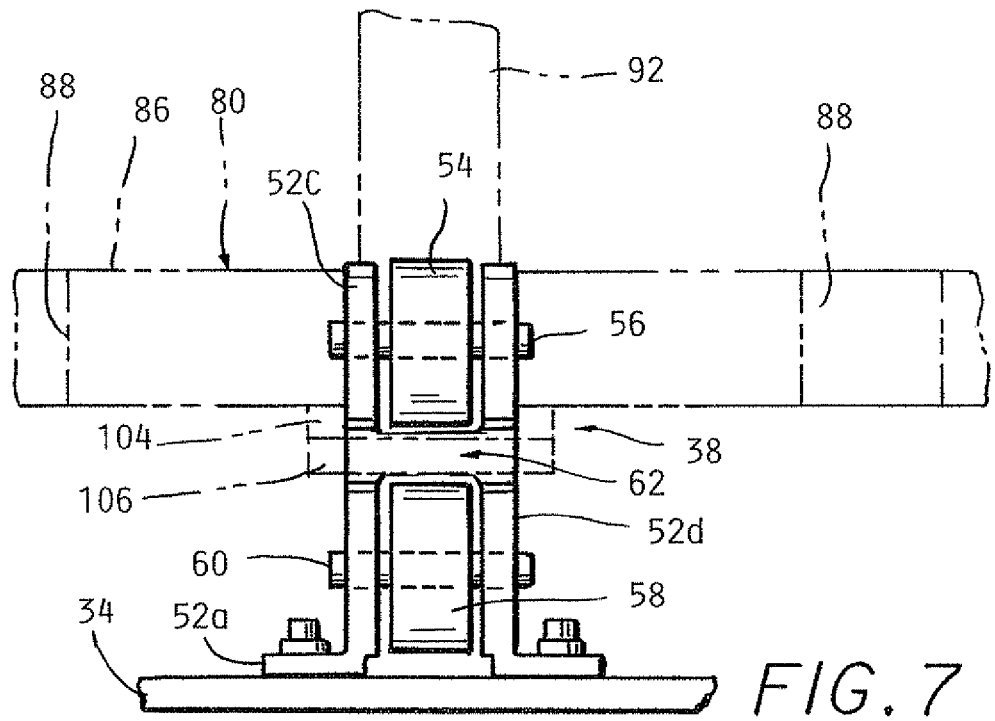
FIGS. 5, 6, 7, 8 and 9 are fragmentary views showing details of a parking mechanism utilized in the framing station.

Each outboard roller assembly 38 (see also FIG. 7) includes a mounting member 52 including a horizontal portion 52a suitably secured to base plate 34 and a vertical portion 52b. Vertical portion 52b includes a pair of upper longitudinally spaced lugs 52c and a pair of lower longitudinally spaced lugs 52d. An upper roller 54 is journaled between upper lugs 52c by a longitudinal pivot pin 56 and a lower roller 58 is journaled between lower lugs 52d by a longitudinal pivot pin 60. Roller 54 is in vertical and longitudinal alignment with roller 58 and the confronting peripheral faces of rollers 54 and 58 define an outboard opening 62.

Clamp assembly 39 (see also FIG. 5) includes a plate 66, a plate 68, an arm 70 and a pad 72.

Plate 66 has a generally triangular configuration and is fixedly secured to an outboard face of pillar 30 and to the underside of base plate 34.

Plate 68 is fixedly secured to an outboard extension 66a of plate 66.

Arm 70 has a bifurcated configuration and is pivotally secured at its inboard end 70a to an upper region of plate 68 by a longitudinally extending pivot pin 73.

Pad 72 is mounted on the outboard end 70b of the bifurcated arm 70.

Each locating structure 16 (see also FIG. 10) includes a pillar 74 upstanding from an intermediate beam 24 of the base structure, a mounting plate 76 secured to the upper face of the pillar, and a locating pad 78 mounted on the upper face of the mounting plate. As seen, three longitudinally spaced locating structures 16 may be provided on each intermediate beam 24 for a total of six locating structures.

Figure 1A:
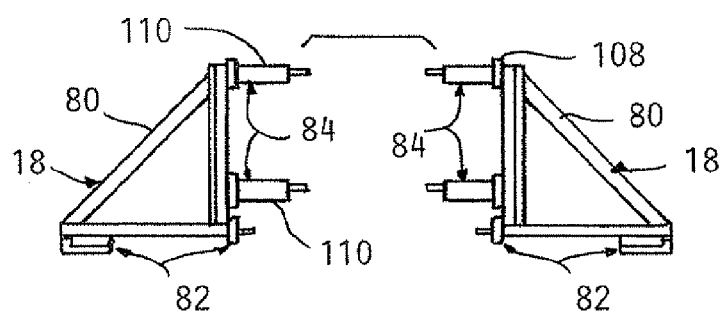
FIGS. 1A, 1B and 1C illustrate sets of gates utilized at the framing station.
Figure 1B:
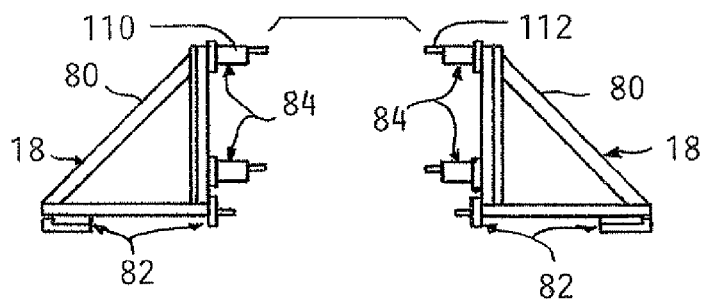
Figure 1C:
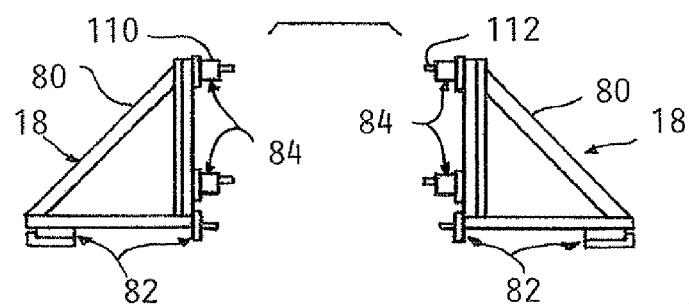
Figure 2:
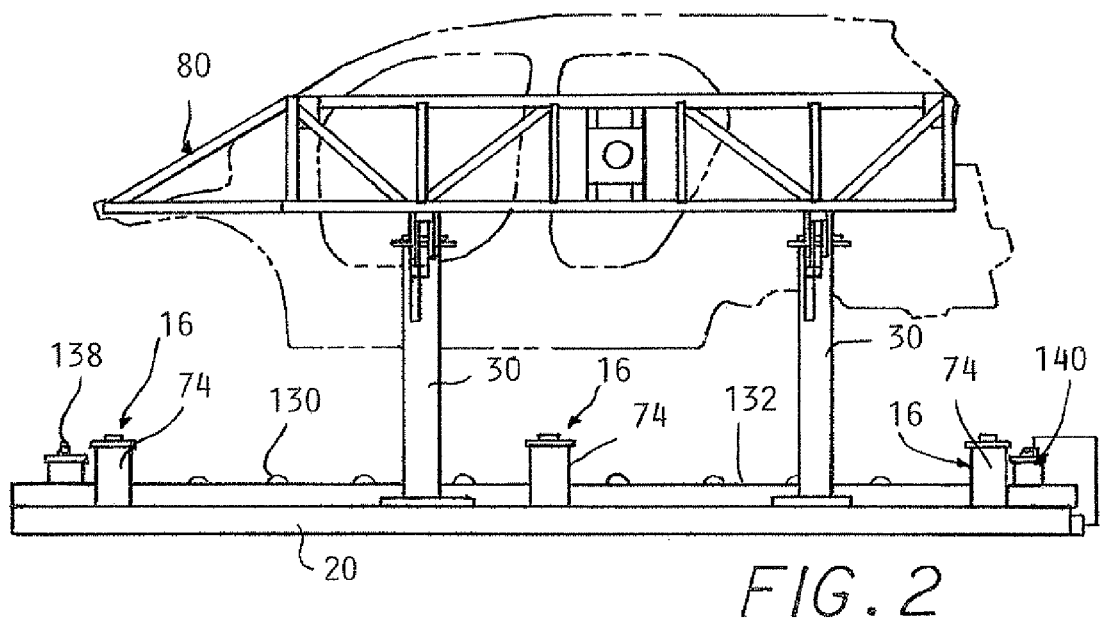
FIG. 2 is a side view of the framing station.
Figure 3:
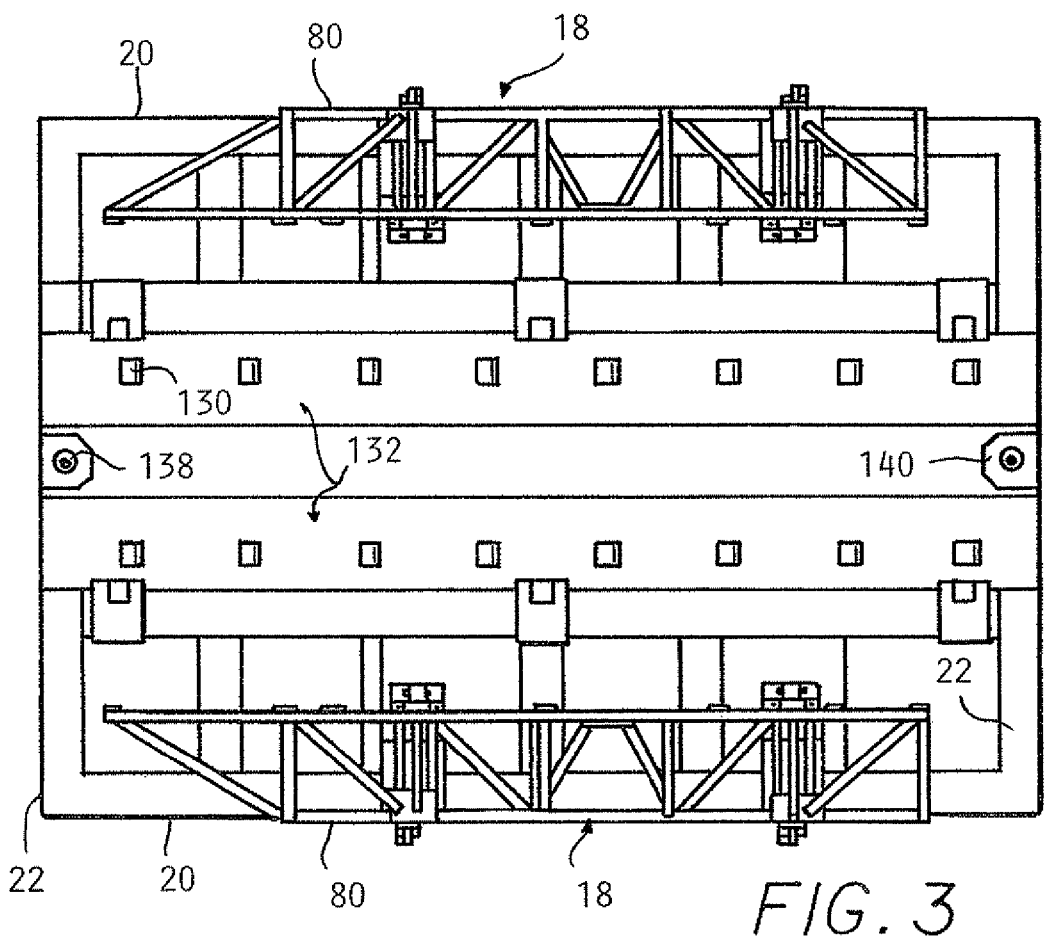
FIG. 3 is a top view of the framing station.

Gate structures 18 are provided in sets with each set including a left gate structure for positioning on the leftside parking structures 14 and a right gate for positioning on the rightside parking structures 14. A first set of gate structures, corresponding to a first motor vehicle body style or model, is seen in FIG. 1 positioned on the parking structures 14 and a plurality of alternate sets of gate structures 18, corresponding respectively to a plurality of alternate motor vehicle body styles or models, are seen in FIGS. 1A, 1B and 1C.

Figure 6:
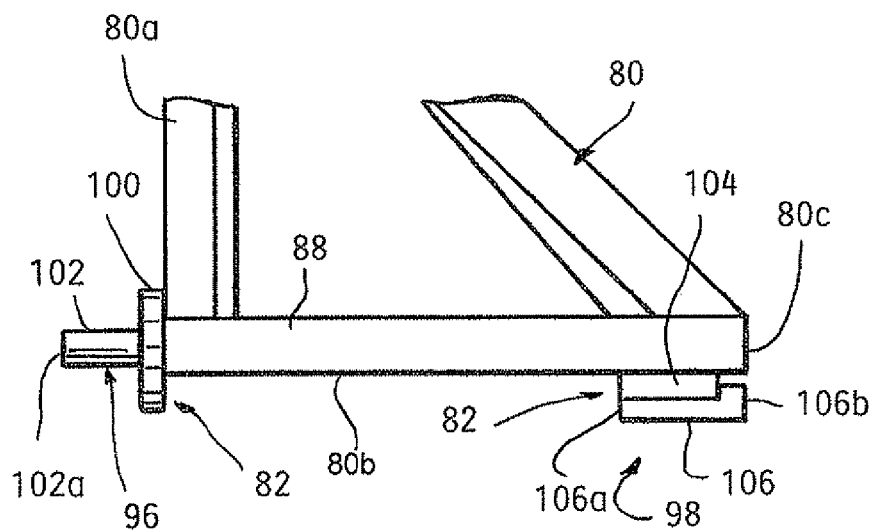

Each gate structure 18 (See also FIG. 6) includes a gate 80, a parking device 82, and a plurality of tooling fixtures 84.

Each gate 80 has an open lattice work structure with a generally right triangular cross-sectional configuration. Specifically, each gate includes triangulated longitudinal members 86, cross-members 88, upright members 90, hypotenuse members 92, and truss members 94.

Each gate includes a pair of longitudinally spaced parking devices 82 for coaction with a respective parking device 32 positioned on a respective pillar 30.

Each parking device 82 includes an inboard parking structure 96 for coaction with an inboard roller assembly 36 of a respective parking device 32 and an outboard parking structure 98 for coaction with an outboard roller assembly 38 of the parking device.

Each inboard parking structure 96 includes a vertical plate 100 fixedly secured to the lower inboard vertical face 80a of the respective gate and extending downwardly from the horizontal underface 80b of the gate, and a circular pilot pin 102 mounted on and extending inboard from the plate 100 and sized to extend transversely into and fit snugly within the opening 48 of an inboard roller assembly 38 of a respective parking device 32.

Each outboard parking structure 98 includes a pair of longitudinally spaced spacer bars 104 secured to the underface 80b of the respective gate proximate the outboard edge 80c of the gate and a transversely extending pilot plate 106 mounted on the underside of the spacer bars in downwardly spaced relation to the lower face of the gate and having a thickness sized to fit snugly within the outboard opening 62 of an outer roller assembly of a respective parking mechanism 32.

Tooling fixtures 84 are sized and configured to precisely position the body panels of a specific motor vehicle body style or model.

Each tooling fixture 84 includes a mounting pad 108 fixedly secured to the inboard vertical face 80a of a respective gate, a tower structure 110 fixedly secured to and extending inboard from the pad, and a tooling device (such for example as a clamp 112) carried on the inboard end of the tower structure. A plurality of spaced tooling fixtures 84 are provided on the inboard face 80a of each gate for selective positioning engagement with the body panels of the specific motor vehicle body style or model for which the tooling fixtures have been sized and configured.

OPERATION

The construction of a unitized vehicle body 120 commences with the formation of individual major body panels by stamping the panels from sheet metal blanks. Typically these major panels (FIG. 4) include a floor panel 122 and right and left body side panels 124. After the individual panels are stamped, some preliminary assembly operations may be performed on the individual panels such, for example, as adding door hinge and latch hardware at the body side panels at appropriate locations proximate the door opening, adding seat mounting brackets, adding reinforcements to the body panel, etc.

Next the panels 122, 124, 124 are loosely assembled together. This initial loose assembly of panels frequently is accomplished by a "toy tab" arrangement in which one or more panels is formed with a tab which projects from an edge and which is received in a slot in an adjacent panel. This technique interlocks the panels to each other to thereby form a preliminary loosely assembled vehicle body wherein the panels will not separate from each other but wherein the panels are free to tilt or otherwise move relative to one another. This initial loosely assembled sub-assembly is then brought into the framing station by a pallet 128 riding on powered rollers 130 (FIGS. 1, 4 and 10) projecting through apertures in transversely spaced longitudinally extending platform members 132. The pallet may include upstanding pylons 134 including pilot pins 134a keying into pilot apertures in floor panel 122 to accurately position the body on the pallet. Once the body has been positioned at the framing station by the pallet 128, rollers 130 are lowered in known manner to allow pallet flange portions 136 to seat on pads 78 to precisely locate the pallet and body within the framing station in a vertical sense. Precise horizontal or longitudinal positioning of the pallet and body within the framing station is achieved utilizing a pilot pin 138 on the base structure proximate the entry end of the framing station coacting with a suitable pilot aperture in the pallet and by stop structure 140 on the base structure proximate the exit end of the framing station.

The positive positioning of the body structure at the framing station is further facilitated by the positive positioning of the gates relative to the framing structure to enable the precise positioning and grasping of the body panels by the tooling fixtures carried by the gates.

The gates in known manner are positioned at the framing station utilizing robots engaging robot mounting plates 150 provided on the vertical walls of the gates and the gates are positively positioned at the framing station utilizing the base parking structures 14 coacting with the gate parking devices 82.

Specifically, as the left and right gates of each set of gates are positioned on the leftside and rightside pillars 30, each pilot pin 102 guides precisely and transversely into an opening 48, in rolling contact with the peripheries of rolls 42, 42, 44, 44, with the inboard transverse movement defined and delimited by the engagement of the leading end 102a of the pin by plate 50, and the leading edge 106a of each guide plate 106 guides precisely and transversely into an opening 62 with the upper face of the pilot plate rollably engaging an upper roller 54, the lower face rollably engaging a lower roller 58, and the inboard transverse movement of the plate defined and delimited by the engagement of the leading end 106a of the plate with the web portion 52e of mounting member 52. Note that the entry of the pilot plate into the opening 62 is facilitated and accommodated by movement of the upper lugs 52c into a space defined between adjacent cross members 88 on the lower face of the gate.

Figure 5:
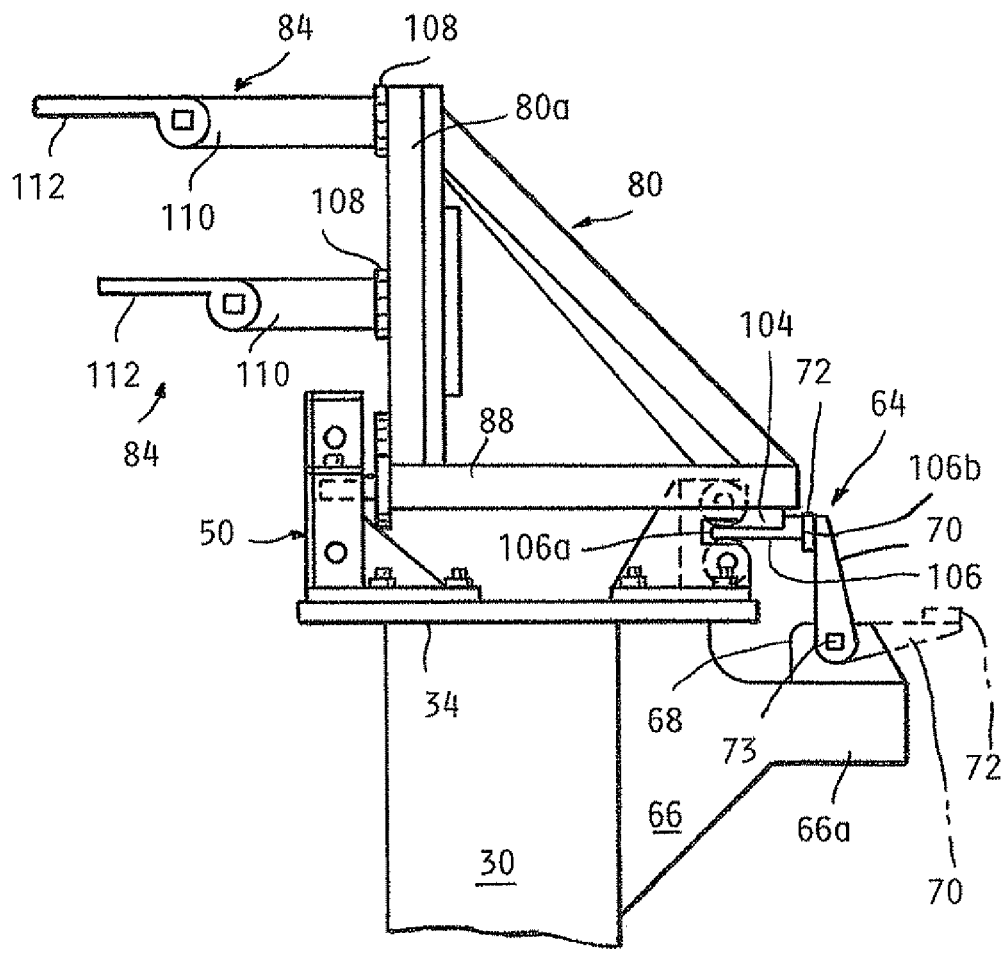

Following the piloting of the pilot pins 102 into the opening 48 and the piloting of the guide plates 106 into the opening 62, arms 70 are pivoted upwardly from their dash line position seen in FIG. 5 utilizing appropriate power devices (not shown) to move the pads 72 into abutting engagement with the outboard edges 106b of guide plates 106 to preclude inadvertent displacement of the gates out of their precise parked position. In this parked position, it will be seen that the gates are precisely positioned in X, (longitudinal), Y (transverse), and Z (vertical) coordinates by the positioning of pilot pins 102 in openings 48 and in Y and X coordinates by the positioning of guide plates 106 in opening 62.

Positioning of the gates precisely on the base parking structures of course has the effect of positioning the tooling fixtures precisely and positively relative to the body of the respective motor vehicle body style as the body arrives on a pallet 128 at the framing station so that the clamps 112 and other tooling devices carried on the tower structures 110 of the tooling fixtures 84 may be actuated to precisely position the side panels 124 preparatory to a welding operation by welding robots (not shown).

Figure 10:
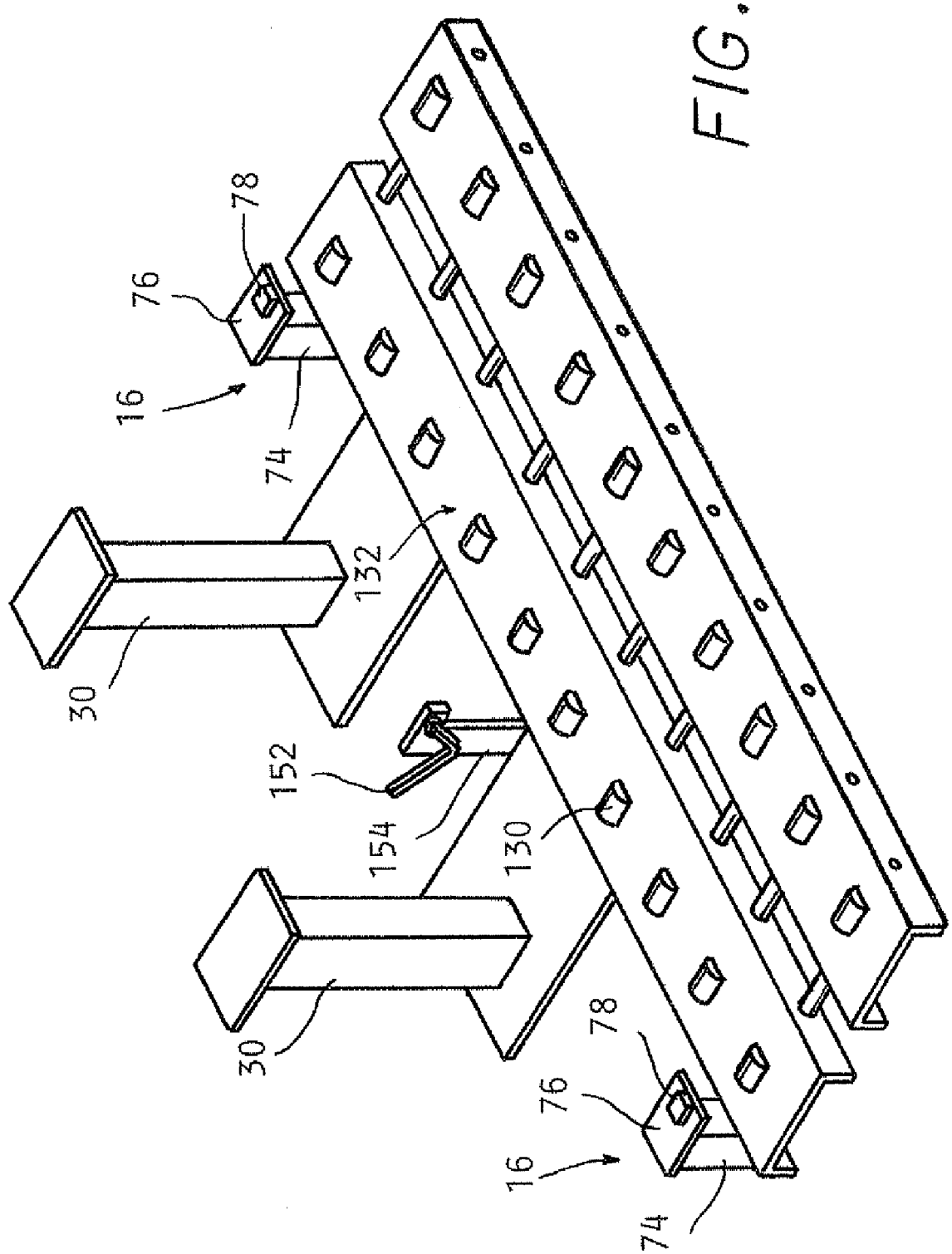
FIG. 10 is a sketch showing a power roll assembly utilized in the framing station.

In some applications, and as seen in FIGS. 4 and 10, it may be desirable to provide further body clamping at the framing station in the form of clamps 152 mounted on pillars 154 at both sides of the framing station. As shown, clamps 152 are pivotal (by suitable power devices, not shown) into positions engaging the sill portions 124a of the body side panels to further enhance the precise positioning of the body component panels preparatory to the welding operation.

The framing apparatus of the invention will be seen to facilitate rapid and precise positioning of the gates at the framing station and will further be seen to facilitate the rapid exchange of gates at the framing station to facilitate a changeover from one motor vehicle body style or model to another. Specifically, and as seen schematically in FIGS. 1A, 1B and 1C, a plurality of sets of gates 80, each having distinctive tooling fixtures 84 mounted thereon corresponding respectively to a plurality of motor vehicle body styles or models and each having identical parking devices 82, are selectively and sequentially positioned on parking structure 14 utilizing robots so as to readily provide the proper tooling fixtures for each set of body panels corresponding to a specific motor vehicle body style or model. In each case, by virtue of the precise interaction between parking devices 32 and parking devices 84, the gates are precisely positioned at the welding station and the respective tooling fixtures are precisely positioned with respect to the body panels of the respective motor vehicle body style or model.

Those skilled in the art will of course readily perceive variations in the preferred embodiment described above. For example, the precise configuration of the parking structures provided on the base structure as well as the precise configuration of the coacting parking devices provided on the base parking structures and on the gates will vary depending on the specifics of the assembly environment.

The invention claimed is:

1. A motor vehicle body framing apparatus located at a welding station for use in precisely positioning body panels arriving at the welding station for welding along a path defining a longitudinal direction, the apparatus including:
    a base structure positioned at the welding station and having a longitudinal extent in the direction of body panel movement and a transverse extent;
    a plurality of upstanding parking structures upstanding vertically from the base structure on either side of the welding station and each having at least one pillar parking device; and
    a pair of longitudinal side gates each carrying tooling fixtures for engagement with body side panels and each including gate parking devices operative in coaction with the pillar parking devices to precisely position the gates on the parking structures and thereby precisely position the tooling fixtures relative to the body panels,
    wherein each parking structure includes a plurality of longitudinally spaced pillars upstanding from the base structure and one of the pillar parking devices positioned on top of each pillar for coaction with the one of the gate parking devices on the respective gates,
    wherein the gate and pillar parking devices coact to position the gates in X (longitudinal), Y (transverse) and Z (vertical) coordinates,
    wherein each pillar parking device includes a first inboard set of rollers arranged in a circumferential array to define an inboard opening therebetween and each gate parking device includes a pilot pin sized to fit in the inboard opening of a respective one of the pillar parking devices,
    wherein the first inboard set of rollers includes a pair of longitudinally spaced rollers arranged for rotation about vertical axes and a pair of vertically spaced rollers arranged for rotation about longitudinal axes and each pilot pin extends in a transverse direction orthogonal to the longitudinal direction into a respective one of the openings, and
    wherein each pillar parking device further includes an outboard set of rollers arranged to define an outboard opening therebetween and each gate parking device further includes a transversely extending guide plate sized to slide transversely into the outboard opening between an outboard set of rollers.

2. A body framing apparatus according to claim 1 wherein each outboard set of rollers includes vertically spaced upper and lower rollers rotatable about longitudinal axes.

3. A body framing apparatus according to claim 2 wherein each pillar parking device further includes an arm positioned outboard of a respective outboard roller set and arranged for pivotal movement between a rest position allowing entry of a respective guide plate into a respective outboard opening and a lock position abuttingly engaging an outboard edge of a guide plate to preclude inadvertent displacement of the respective gate out of its parked position.

4. A motor vehicle body framing apparatus located at a welding station for use in precisely positioning a plurality of body panel sets, corresponding respectively to a plurality of motor vehicle body styles selectively positioned at the welding station for welding, the apparatus including:
    a plurality of sets of gates each having tooling fixtures mounted thereon, the tooling fixtures of each set of gates corresponding to a respective body style of the plurality of motor vehicle body styles and each set of gates having identical gate parking devices as other sets of gates; and
    a plurality of parking structures positioned at the welding station including a plurality of pillars spaced in a longitudinal direction in which body panel sets travel to the welding station, each pillar having a pillar parking device positioned on top of each pillar operative in coaction with one of the gate parking devices to precisely position the respective gate at the welding station, each pillar parking device including a first inboard set of rollers including a pair of longitudinally spaced rollers arranged for rotation about vertical axes and a pair of vertically spaced rollers arranged for rotation about longitudinal longitudinal axes, the inboard rollers further arranged in a circumferential array defining art inboard opening therebetween and a second outboard set of rollers arranged to define an outboard opening therebetween,
    wherein each gate parking device further includes a transversely extending guide plate sized to slide transversely into the outboard opening between the second outboard set of rollers and a pilot pin sized and oriented to slide transversely into the inboard opening between the inboard set of rollers.

5. A body framing apparatus according to claim 4 wherein each outboard set of rollers includes vertically spaced upper and lower rollers rotatable about longitudinal axes.

6. A body framing apparatus according to claim 5 wherein each pillar parking device further includes an arm positioned outboard of a respective outboard roller set and arranged for pivotal movement between a rest position allowing entry of a respective guide plate into a respective outboard opening and a lock position abuttingly engaging an outboard edge of a guide plate to preclude inadvertent displacement of the respective gate out of its parked position.

* * * * *